US008774121B2

(12) United States Patent
Martin et al.

(10) Patent No.: US 8,774,121 B2
(45) Date of Patent: *Jul. 8, 2014

(54) METHOD AND APPARATUS FOR TRANSMISSION PROTOCOL UPLINK CHANNEL SELECTION

(71) Applicant: Broadcom Corporation, Irvine, CA (US)

(72) Inventors: Brian Alexander Martin, Farnham (GB); Keiichi Kubota, Weybridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,790

(22) Filed: Mar. 1, 2013

(65) Prior Publication Data

US 2013/0178222 A1    Jul. 11, 2013

Related U.S. Application Data

(63) Continuation of application No. 13/339,458, filed on Dec. 29, 2011, now Pat. No. 8,437,302, which is a continuation-in-part of application No. 13/208,700, filed on Aug. 12, 2011, now abandoned.

(51) Int. Cl.
*H04W 76/02*    (2009.01)

(52) U.S. Cl.
USPC .............................. 370/329; 370/432; 455/450

(58) Field of Classification Search
None
See application file for complete search history.

(56) References Cited

U.S. PATENT DOCUMENTS

| 2005/0254454 | A1 | 11/2005 | Ozluturk |
| 2009/0034416 | A1 | 2/2009 | Baron et al. |
| 2009/0181710 | A1* | 7/2009 | Pani et al. ..................... 455/509 |
| 2009/0196230 | A1* | 8/2009 | Kim et al. ..................... 370/328 |
| 2009/0196261 | A1* | 8/2009 | Sambhwani et al. ......... 370/335 |
| 2010/0202392 | A1* | 8/2010 | Zhang et al. .................. 370/329 |
| 2011/0021233 | A1 | 1/2011 | Tsuboi et al. |
| 2012/0176951 | A1* | 7/2012 | Pradas et al. .................. 370/312 |

FOREIGN PATENT DOCUMENTS

| WO | WO 2010/051514 A1 | 5/2010 |
| WO | WO 2011/016012 A1 | 2/2011 |

OTHER PUBLICATIONS

Ericsson, 3GPP TSG-RAN WG2 #74, "Fallback for to R99 RACH", (May 9-13, 2011), R2-113325, (2 pages).
Hwawei, 3GGPP TSG RAN WG2 #74, "Discussion on Fallback to R99 PRACH", (May 9-13, 2011), R2-113011, (2 pages).
Ericsson, 3GPP TSG-RAN WG2 #73bis, "Overview of Cell_FACH Enhancements", (Apr. 11-15, 2011), R2-112323, (5 pages).
Huawei, 3GPP TSG-RAN WG2 #73b, "Discussion on Fallback to R99 PRACH", (Apr. 11-15, 2011), R2-112059, (2 pages).

(Continued)

Primary Examiner — Jianye Wu
(74) Attorney, Agent, or Firm — Foley & Lardner LLP; Christopher J. McKenna; Paul M. H. Pua

(57) ABSTRACT

First and second wireless transmission protocol uplink channels are available for use by a wireless device in transmitting data to a network. In various examples, the device selects between the first and second wireless transmission protocol uplink channels according to various different criteria. Examples include selecting between the first and second wireless transmission protocol uplink channels according to the type of data to be transmitted and according to the identity of the device, and various combinations of these.

19 Claims, 6 Drawing Sheets

(56) References Cited

OTHER PUBLICATIONS

Catt, 3GPP TSG-RAN WG2 Meeting #63, "Further Discussion on UL Data Transmission in Enhanced CELL-FACH State for LCR TDD", (Aug. 18-22, 2008), R2-084243, (6 pages).
Nokia Siemens, 3GPP TSG-RAN WG2 #74, "Fallback for to R99 RACH", (May 9-13, 2011), R2-113169, (2 pages).
Zte, "Proposal on Uplink Data Transmission in enhanced CELL-FACH State", (Sep. 29-Oct. 3, 2008), R2-085513, (2 pages).
Combined Search and Examination Report under Sections 17 and 18(3) for UK Application No. GB1117740.9 dated Feb. 9, 2012 (7 pages).
PCT International Search Report issued in a related International Application No. PCT/IB054095, mailed Feb. 4, 2013 (3 pages).
Notice of Allowance and Notice of Allowability mailed Feb. 6, 2013, including Notice of References Cited, issued in related U.S. Appl. No. 13/339,458, filed Dec. 29, 2011 (11 page).
Non-final Office Action dated Aug. 16, 2013, which was issued a related U.S. Appl. No. 13/208,700, filed Aug. 12, 2011 (16 pages).

\* cited by examiner

METHOD AND APPARATUS FOR TRANSMISSION PROTOCOL UPLINK CHANNEL SELECTION

CROSS REFERENCE TO RELATED APPLICATIONS

This application is a Continuation of U.S. patent application Ser. No. 13/339,458, filed Dec. 29, 2011, which is in turn a Continuation-In-Part of U.S. patent application Ser. No. 13/208,700, filed Aug. 12, 2011 and claims benefit under 35 U.S.C. §119(a) and 37 CFR 1.55 to U.K. Patent Application No. GB1113877.3, filed Aug. 12, 2011, the entire disclosure of each of which is hereby incorporated herein by reference.

TECHNICAL FIELD

The present invention relates to a method and apparatus for selecting a wireless transmission protocol uplink channel.

BACKGROUND INFORMATION

Wireless networks have in recent years experienced a considerable increase in the amount of data being transmitted to and from wirelessly connected devices or user equipment, which term includes mobile or cell phones (including so-called "smart phones"), personal digital assistants, pagers, tablet and laptop computers, content-consumption or generation devices (for music and/or video for example), data cards, or USB dongles, etc., as well as fixed or more static devices, such as personal computers, game consoles and other generally static entertainment devices, various other domestic and non-domestic machines and devices, etc. This increase in traffic has been mainly due to the rapid and widespread uptake of smart phones, the availability of mobile broadband dongles for computers and affordable rates for consumers.

The traffic characteristics of this data traffic are very different from that of traditional mobile phones, and can be characterized by its use of a lot of background signalling and bursty traffic consisting of relatively small data packets. The introduction of machine type communications to the networks can be expected to follow this trend. As a result, wireless networks need to implement new mechanisms to cope with this new traffic and make efficient use of the available resources while providing high capacity and throughputs and minimum delays, and particularly to avoid congestion, which can result in the user equipment being in a "call blocked" state.

The user equipment is typically in one of a number of predefined activity states. These may be for example an idle state, a paging state in which the user equipment checks the paging channel for incoming paging messages at predefined time intervals, and one or more data connection states in which the user equipment can actively transmit and receive data. In general, these states use increasingly more power at the user equipment and also more network signalling.

This can be exemplified by work currently being carried out on FE-FACH (Further Enhancement to CELL_FACH (Forward Access Channel)) for Release 11 of the 3rd Generation Partnership Project or 3GPP. The system currently in use provides for a number of defined activity states for the user equipment, including an Idle state, a CELL_PCH/URA_PCH (paging channel) state, a CELL_FACH (forward access channel) state, and a CELL_DCH (dedicated channel) state. In the Idle state, the user equipment does not have an RRC (Radio Resource Control) connection and is the state having the lowest power consumption. In the CELL_PCU/URA_PCH state, the user equipment is again in a low power consumption state as it only periodically looks for incoming paging messages, and in this state does have a RRC connection. However, the user equipment needs to be in the CELL_FACH or CELL_DCH state in order to be able to perform both transmission and reception of data (including in particular "user" data, as opposed to data relating to control or management of the device and its network connection, etc. for example). In the CELL_DCH state, a dedicated physical channel is allocated to the user equipment. In the CELL_FACH state, the user equipment shares the physical channel with other user equipment, though nevertheless may have a dedicated logical channel. As is well understood, a logical channel in this context is an information stream dedicated to the transfer of a specific type of information over the radio interface and corresponds to an individual signal which can be separated or isolated from an aggregate of signals which occupy the same physical bandwidth or channel. CELL_FACH can be regarded as a transition state between the idle/CELL_PCH/URA_PCH and CELL_DCH states. Keeping the user equipment in CELL_FACH state improves power consumption for the user equipment compared to the CELL_DCH state (because the transmitter and/or receiver may be switched off for longer periods of time while no uplink data is available and during discontinuous reception or "DRX") and also reduces the network signalling load (by avoiding radio resource control or "RRC" signalling to perform a state transition from the PCH or Idle states to the CELL_FACH state when both data transmission and reception are required). Nevertheless, the CELL_FACH state still has a higher power consumption for the user equipment than the PCH or Idle states.

The CELL_FACH state was enhanced with the introduction of downlink HS-DSCH (high speed downlink shared channel) transmission in Release 7 of 3GPP and uplink E-DCH (enhanced dedicated channel) transmission in Release 8 of 3GPP. These enhancements of the transmission channels within the CELT_FACH state provide substantial improvements compared to R99 FACH/RACH (forward access channel/random access channel), which were previously used for downlink and uplink transmissions in accordance with the original release of the WCDMA (Wideband Code Division Multiple Access) standard. Nevertheless, as the packet data traffic related to mobile and fixed wireless broadband, smart phones and machine type communications continues to increase, it becomes increasingly attractive to try to keep the user equipment in the CELL_FACH state since other states are associated with either a higher latency or a higher resource demand, and to have the user equipment operating in the CELL_FACH state in as efficient a manner as possible. In order to facilitate this type of operation, a number of further enhancements of the CELL_FACH state are being considered.

As a particular example, there are a number of reasons why it is desirable to have wireless devices or user equipment (or "UEs") that are in the CELL_FACH state use PRACH (physical random access channel) for uplink transmissions when possible, in preference to using the enhanced uplink channel E-DCH (known as "enhanced uplink in CELL_FACH state and idle mode" in 3GPP). For example, having a number of UEs operate using PRACH reduces the chances that those UEs using common E-DCH will enter a call blocked state (for example because of a failure of the contention procedure due to a lack of network resources or because of message collision for those UEs). As another example, when the UE has small data packets to send, then it is more efficient to use the PRACH channel as the network resources can be reclaimed more quickly than those associated with the enhanced uplink channel E-DCH channel, leading to more effective use of NW resources. Also, in the case of the UE sending small data packets, the speed at which these messages can be transmitted is comparable when using PRACH and common E-DCH (as these control messages are in general small enough to be conveyed in the message part of a single RACH transmission), whereas when larger amounts of data needs to be sent, the common E-DCH channel is more efficient; sending smaller messages on the PRACH channel frees up capacity on the highly loaded common E-DCH channels for larger messages. In the present context, "small" messages may be those of a size of 360 bits or less, or less than 166 bits in specific cases. Such messages include in particular CCCH (Common Control Channel) transmission messages.

For completeness, it is finally noted that prior to the introduction of the common E-DCH in Release 8 of 3GPP, wireless devices or UEs always used the PRACH resource to send uplink data to a network when in the CELL_FACH state. Following the introduction of the common E-DCH in Release 8 of 3GPP, in order to send uplink data to a network when in the CELL_EACH state, the UEs that are not capable of using the common E-DCH always use the PRACH resource, whereas the UEs that are capable of using the common E-DCH always use the Release 8 common E-DCH resource (see for example the Release 8 Technical Specification 25.331).

Despite these known benefits of using the PRACH resource in certain circumstances, and indeed the requirement to use it in some circumstances (such as for older, legacy or other devices that cannot use common E-DCH), there is currently no process for balancing the uplink load between the PRACH and Release 8 common E-DCH resources that available for the wireless devices or UEs in a cell which are connected to a particular base station (or "Node B" as it is termed in the specific case of the Universal Mobile Telecommunications System (UMTS), eNodeB or Evolved Node B (eNB) in the case of LTE, etc.).

SUMMARY

According to a first aspect of the present invention, there is provided a method of selecting one of at least a first wireless transmission protocol uplink channel and a second wireless transmission protocol uplink channel for use by a wireless device in transmitting data to a network, the first and second transmission protocols being different from each other, the method comprising one of: a wireless device selecting a first wireless transmission protocol uplink channel for use by the wireless device when transmitting a first type of data and selecting a second wireless uplink transmission protocol channel for use by the wireless device when transmitting a second type of data; and the wireless device selecting the first wireless transmission protocol uplink channel for use by the wireless device if the wireless device has an identity of a first type and selecting the second wireless transmission protocol uplink channel for use by the wireless device if the wireless device has an identity of a second type.

Thus, there may be provided a method of selecting one of at least a first wireless transmission protocol uplink channel and a second wireless transmission protocol uplink channel for use by a wireless device in transmitting data to a network, the first and second transmission protocols being different from each other, the method comprising: a wireless device selecting a first wireless transmission protocol uplink channel for use by the wireless device when transmitting a first type of data; and the wireless device selecting a second wireless uplink transmission protocol channel for use by the wireless device when transmitting a second type of data. As an alternative, there may be provided a method of selecting one of at least a first wireless transmission protocol uplink channel and a second wireless transmission protocol uplink channel for use by a wireless device in transmitting data to a network, the first and second transmission protocols being different from each other, the method comprising: a wireless device selecting a first wireless transmission protocol uplink channel for use by the wireless device if the wireless device has an identity of a first type; and the wireless device selecting a second wireless transmission protocol uplink channel for use by the wireless device if the wireless device has an identity of a second type.

This allows for balancing the uplink load between the first and second wireless transmission protocol uplink channels in a manner that can be implemented in a simple and straightforward way. The device simply selects the first or second wireless transmission protocol uplink channel depending on the type of data to be transmitted. In this context, the "type" of data relates for example to the nature of the data, such as if it is control data (or a particular type of control data), or "user" data. Alternatively, the device selects the first or second wireless transmission protocol uplink channel depending on the identity of the device. The first and second wireless transmission protocol uplink channels are typically channels available in a single activity state occupied by the wireless device.

In an embodiment, in the case that the wireless device selects the first or second wireless transmission link according to the type of data, the wireless device selects the second wireless uplink transmission protocol channel for transmitting the second type of data only when the second wireless uplink transmission protocol channel becomes available but continues to use the first wireless transmission protocol uplink channel for transmitting the first type of data even if the second wireless uplink transmission protocol channel has become available. In some practical implementations, the second wireless uplink transmission protocol channel may not always be available or may not be immediately available. Nevertheless, it can be desirable for the wireless device always to keep separate the use of the channels for the different types of data in order to provide a better balancing of use of the channels for data transmissions.

In an embodiment, in the case that the wireless device selects the first or second wireless transmission link according to the identity type of the wireless device, the identity of the wireless device is determined by a numerical identifier of the device. This provides a simple way of dividing the devices in for example a network cell as to their use of the uplink channels, which is easy to implement. The numerical identifier may be for example a number (which term includes a string of bits for example) initially used by the device for channel access, or a unique number allocated to the wireless device by a network control apparatus. The allocated number may be for example the U-RNTI (Universal Mobile Telecommunications System Terrestrial Radio Access Network Radio Network Temporary Identifier). In an embodiment, the identifier is a string of bits, the wireless device having an identity of the first type if a particular one of the bits is a 0 and having an identity of the second type if said particular one of the bits is a 1. This is a simple way of, on average, dividing the devices in for example a cell into two groups as to their use of the uplink channels, the groups on average being of approximately the same size. The particular bit may conveniently be the Least Significant Bit of the identifier, though others ones of the bits may be used for this purpose.

In an embodiment, the first type of data is control channel data. In a particular example, the first type of data is common control channel data. Control data is typically responsible for transferring control information between wireless devices and the base station (or equivalent) for call origination and call paging purposes, depending on the transmission standard and protocols being used.

In an embodiment, the second type of data is at least one of dedicated control channel data and dedicated traffic channel data. Dedicated control channel data is typically used for connection establishment (call setup, authentication) and for location updating (registration) and handover decisions, and dedicated traffic channel data is typically used for transferring user data, again depending on the transmission standard and protocols being used.

In an embodiment, the first wireless transmission protocol uplink channel is the 3GPP Physical Random Access Channel and the second wireless transmission protocol uplink channel is the 3GPP Common Enhanced Dedicated Channel.

According to a second aspect of the present invention, there is provided a method of selecting one of at least a first wireless transmission protocol uplink channel and a second wireless transmission protocol uplink channel for use by a wireless device in transmitting data to a network, the first and second transmission protocols being different from each other, the method comprising: a wireless device selecting a first wireless transmission protocol uplink channel for use by the wireless device when transmitting a first type of data and the wireless device has an identity of a first type; a wireless device selecting a second wireless transmission protocol uplink channel for use by the wireless device when transmitting the first type of data and the wireless device has an identity of a second type; and the wireless device selecting the second wireless uplink transmission protocol channel for use by the wireless device when transmitting a second type of data.

In this aspect, the use of the uplink channels can be allocated in a way that provides for finer control of the balancing of resources between the uplink channels.

According to a third aspect of the present invention, there is provided apparatus comprising: at least one processor; and at least one memory including computer program code; the at least one memory and the computer program code being configured to, with the at least one processor, cause the apparatus at least to: select a first wireless transmission protocol uplink channel for use when transmitting a first type of data; and select a second wireless uplink transmission protocol channel for use when transmitting a second type of data; the first and second wireless uplink transmission protocols being different from each other.

According to a fourth aspect of the present invention, there is provided apparatus comprising: at least one processor; and at least one memory including computer program code; the at least one memory and the computer program code being configured to, with the at least one processor, cause the apparatus at least to: select a first wireless transmission protocol uplink channel for use when transmitting if the apparatus has an identity of a first type; and select a second wireless transmission protocol uplink channel for use when transmitting if the apparatus has an identity of a second type; the first and second transmission protocols being different from each other.

According to a fifth aspect of the present invention, there is provided apparatus comprising: at least one processor; and at least one memory including computer program code; the at least one memory and the computer program code being configured to, with the at least one processor, cause the apparatus at least to: select a first wireless transmission protocol uplink channel for use when transmitting a first type of data and the apparatus has an identity of a first type; select a second wireless transmission protocol uplink channel for use when transmitting the first type of data and the apparatus has an identity of a second type; and select the second wireless uplink transmission protocol channel for use when transmitting a second type of data; the first and second transmission protocols being different from each other.

There is also provided a wireless device which is wirelessly connectable to a wireless network, the wireless device having apparatus as described above.

There is also provided a computer program comprising code such that when the computer program is executed on a computing device, the computing device is arranged to carry out a method as described above. This may be provided as a computer readable medium comprising a set of instructions, which, when executed by a processing system, cause the processing system to operate as described above Further features and advantages of the invention will become apparent from the following description of preferred embodiments of the invention, given by way of example only, which is made with reference to the accompanying drawings.

DETAILED DESCRIPTION

Embodiments of the present invention provide various techniques for a wireless device (or "user equipment" or "UE") to select between two or more wireless uplink Channels over which to transmit data. The wireless transmission protocol uplink channels are typically channels of a single activity state occupied by the wireless device at a particular time, which are available as alternatives to each other for use by the wireless device when transmitting uplink data. In broad terms, the wireless device can select between the channels according to the type of data to be transmitted (which can be regarded as a selection on a logical channel type basis), according to the identity of the wireless device, or appropriate combinations of these two basic criteria. Moreover, further criteria may be applied in addition, for example relating to the size of the individual data packet(s) to be transmitted.

In general terms, examples of embodiments of the present invention that operate according to Release 11 3GPP discussed above may operate as follows.

A first example is selecting the wireless transmission protocol uplink channel on a per logical channel type basis (i.e. according to the type of data to be transmitted by the wireless devices). The logical channel/type of data may be divided notionally into different groups. A first example might be to regard common control channel data as a first type of data and each of dedicated control channel data and dedicated traffic channel data as a second type of data. As is known, common control channel or CCCH data is typically responsible in this context for transferring control information between wireless devices and the base station (or equivalent) for call origination and call paging purposes. On the other hand, again as is known, dedicated control channel or DCCH data is typically responsible in this context for connection establishment (call setup, authentication) and for location updating (registration) and handover decisions, and dedicated traffic channel or DTCH data is typically user data. Other ways of notionally dividing the data into different groups are possible, particularly according to the nature or function of the data. For example, an alternative is to transmit all control channel data (CCCH, DCCH) on PRACH, while transmitting all traffic channel data (DTCH) on DCH. Yet another alternative is to transmit traffic channel data from different radio bearers on PRACH or E-DCH, depending on for example the quality of service required or the urgency of the service (for example "low priority" data such as that data generated by some MTC device applications may be transmitted on PRACH while high priority data such as VoIP may be transmitted on E-DCH).

Figure 1:
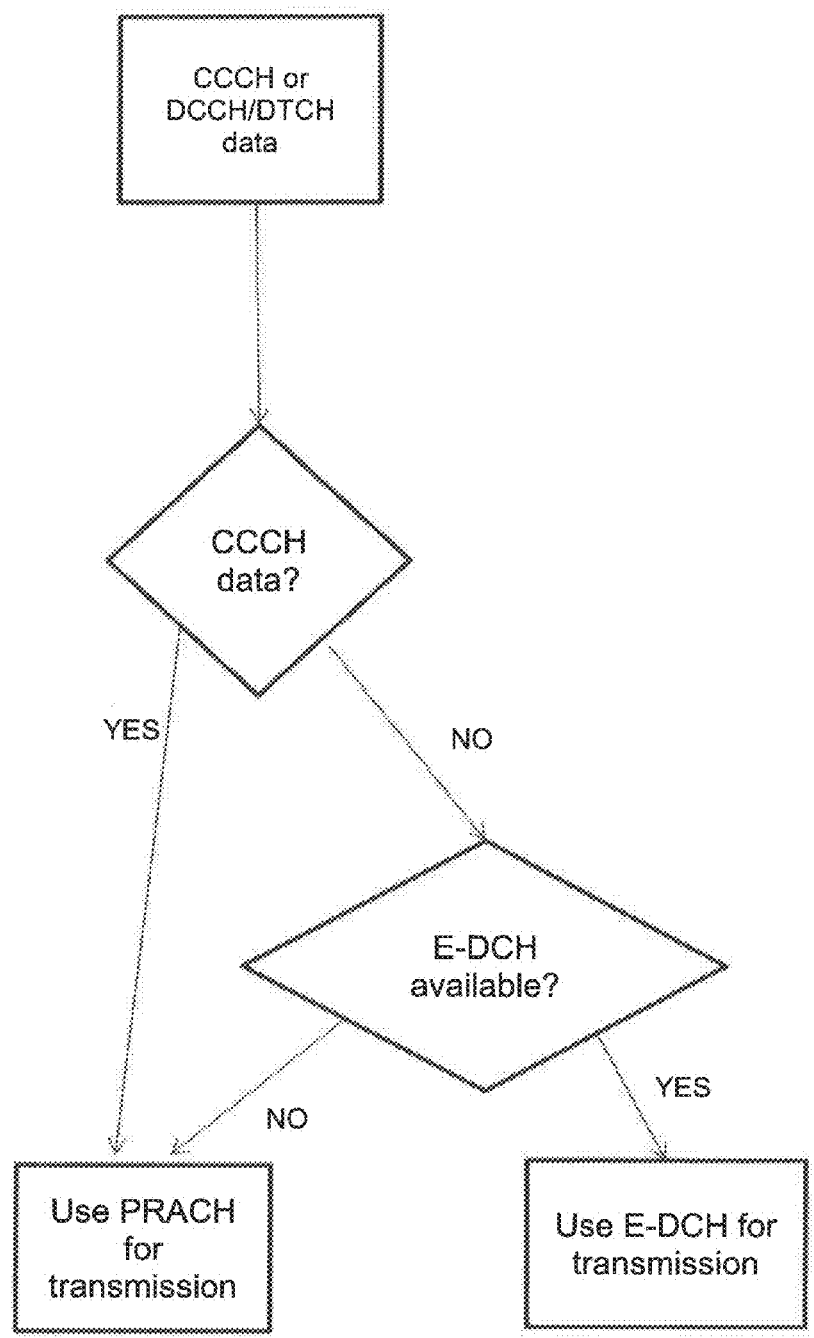
FIG. 1 shows schematically a logic flow diagram of a first example of an embodiment of the present invention.

Referring to the discussion above in relation particularly to the availability of both PRACH and common E-DCH as uplink channels in the CELL_FACH state, and also to the schematic logic flow diagram of FIG. 1, a particular implementation of this first example operates as follows:
1. The UE always uses PRACH when uplink CCCH data is transmitted.
2. The UE uses common E-DCH for uplink DCCH and uplink DTCH data transmission after DCCH/DTCH become available.

In general, R99 RACH is more suitable for transmission of a small amount of data and common E-DCH is more suitable for transmission of a large amount of data. This example enables the UE to use the uplink resource that is most suitable or appropriate for the type of data. For example, UL CCCH is typically a relatively small message, which can be sent in 1 transmission timing interval on PRACH. On the other hand, DTCH is real user data so it may require continuous high-speed data transfer, for which common E-DCH is more suitable. Similarly, for the first alternative above, the control channel data CCCH and DCCH can both be send on MACH as they both typically comprise small data messages. Moreover, this example is fairly easy to implement with minimal complexity in a wireless device.

A second example is selecting the wireless transmission protocol uplink channel on the basis of the identity of the wireless devices. Various ways of distinguishing the wireless devices (i.e. in these specific examples, the wireless devices connected to a network, for example a network cell and connected to a base station or the like) according to identity are available. One option uses an identity number (or string of bits) of the wireless device. This may be for example an intrinsic or initial identity number of the device. In certain example embodiments, this is the initial UE Identity, transmitted in the RRC Connection Request, which is one of its TMSI (Temporary Mobile Subscriber Identity), P-TMSI (Packet Temporary Mobile Subscriber Identity), IMSI (International Mobile Subscriber Identity) or IMEI (International Mobile Equipment Identity), depending on availability in the device. Alternatively, particularly when the device is actually connected to a network and/or depending on the data to be transmitted, the identity number may be the device's (typically temporarily) assigned network identity. One example of the assigned network identity is a HS-DSCH radio network temporary identifier (H-RNTI). In certain example embodiments, this may be the device's U-RNTI, i.e. its UTRAN (Universal Mobile Telecommunications System Terrestrial Radio Access Network) Radio Network Temporary Identifier, which is assigned by the SRNC (serving Radio Network Controller). The RRC connection is defined as a point-to-point bi-directional connection between RRC peer entities in the UE and the UTRAN characterised by the allocation of a U-RNTI. A UE has either zero connections or one RRC connection. The U-RNTI uniquely identifies the UE within the SRNS (Serving Radio Network Subsystem).

Figure 2A:
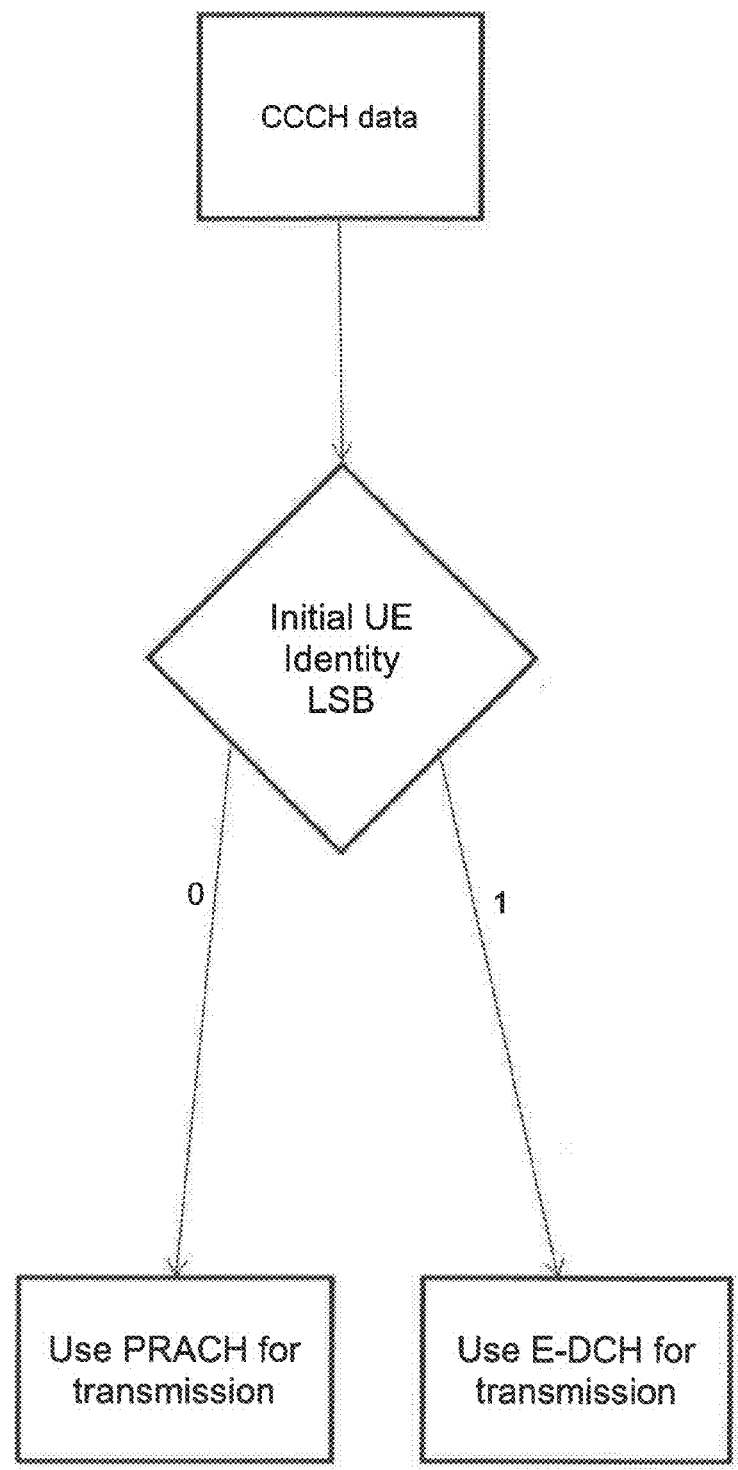
FIGS. 2A and 2B show schematically logic flow diagrams of two variations of a second example of an embodiment of the present invention.
Figure 2B:
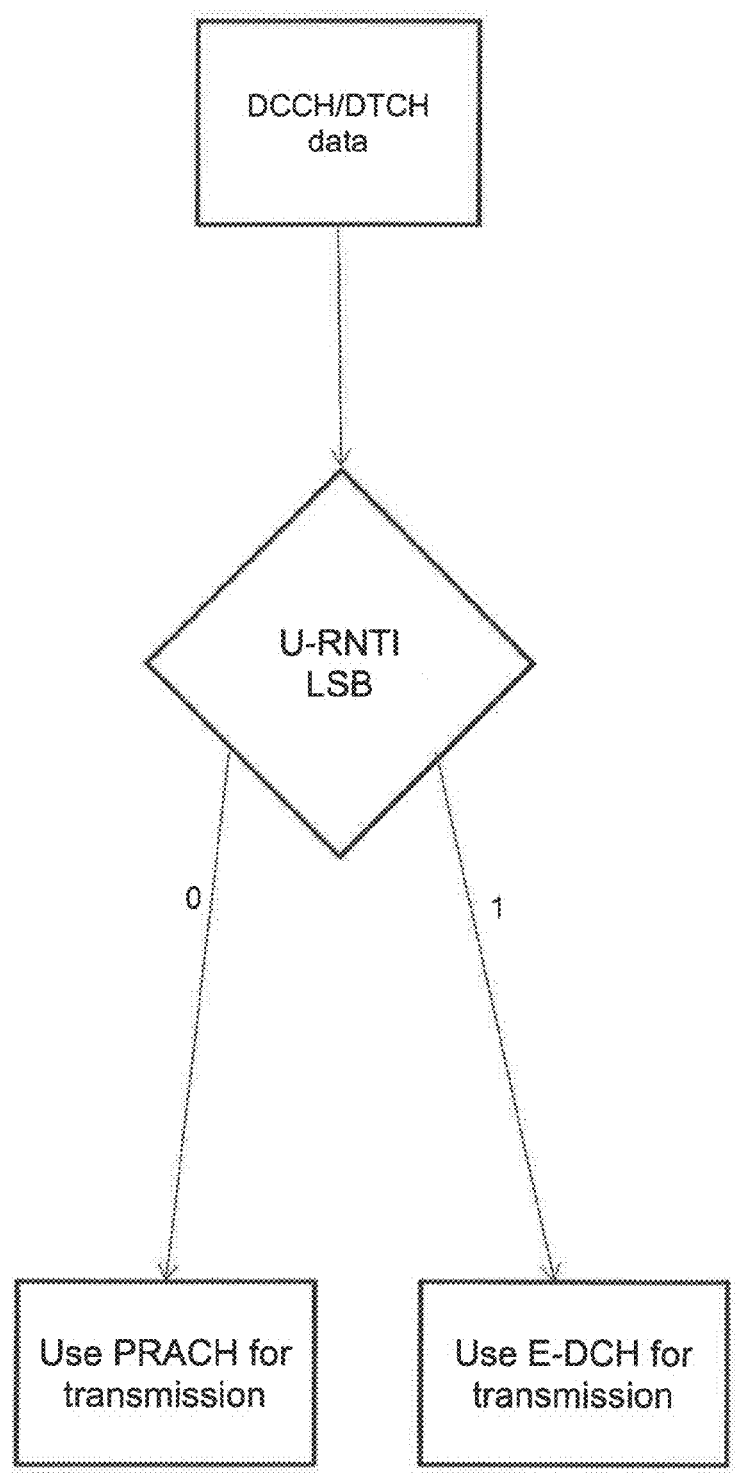

Referring again to the discussion above in relation particularly to the availability of both PRACH and common E-DCH as uplink channels in the CELL_FACH state, and also to the schematic logic flow diagrams of FIGS. 2A and 2B, a particular implementation of this second example operates as follows:
1. The UE chooses PRACH or common E-DCH based on the UE identity.
  For example:
1a. For UL CCCH data transmission, PRACH is selected if the initial UE identity's LSB (least significant bit) is 0, otherwise common E-DCH is selected (see FIG. 2A).
1b. For UL DCCH or DTCH data transmission. PRACH is selected if the U-RNTI's LSB is 0, otherwise common E-DCH is selected (see FIG. 2B).

This example has the particular advantage that the network control apparatus can explicitly perform load balancing by fine-tuning the UE identity for each of the connected UEs. For example, the SGSN/MSC (Serving General Packet Radio Service Support Node/Mobile Services switching Centre) can fine-tune the initial UE identity for the UEs and/or the RNC (Radio Network Controller) can fine-tune the U-RNTI allocated to the connected UEs in use to achieve load balancing between PRACH and common E-DCH. The network control apparatus is therefore provided with tight control over the traffic to address specific load-balancing scenarios which may arise, allowing control on a per-UE basis.

A third example of selecting the wireless transmission protocol uplink channel may be based on mixtures or combinations of the approaches used for the first and second examples. In one example of this, in broad terms, a wireless device selects a first wireless transmission protocol uplink channel for use when transmitting a first type of data if the wireless device has an identity of a first type. The wireless device selects a second wireless transmission protocol uplink channel for use both (i) when transmitting the first type of data and the wireless device has an identity of a second type, and (ii) when transmitting a second type of data (irrespective of the identity of the wireless device).

Figure 3:
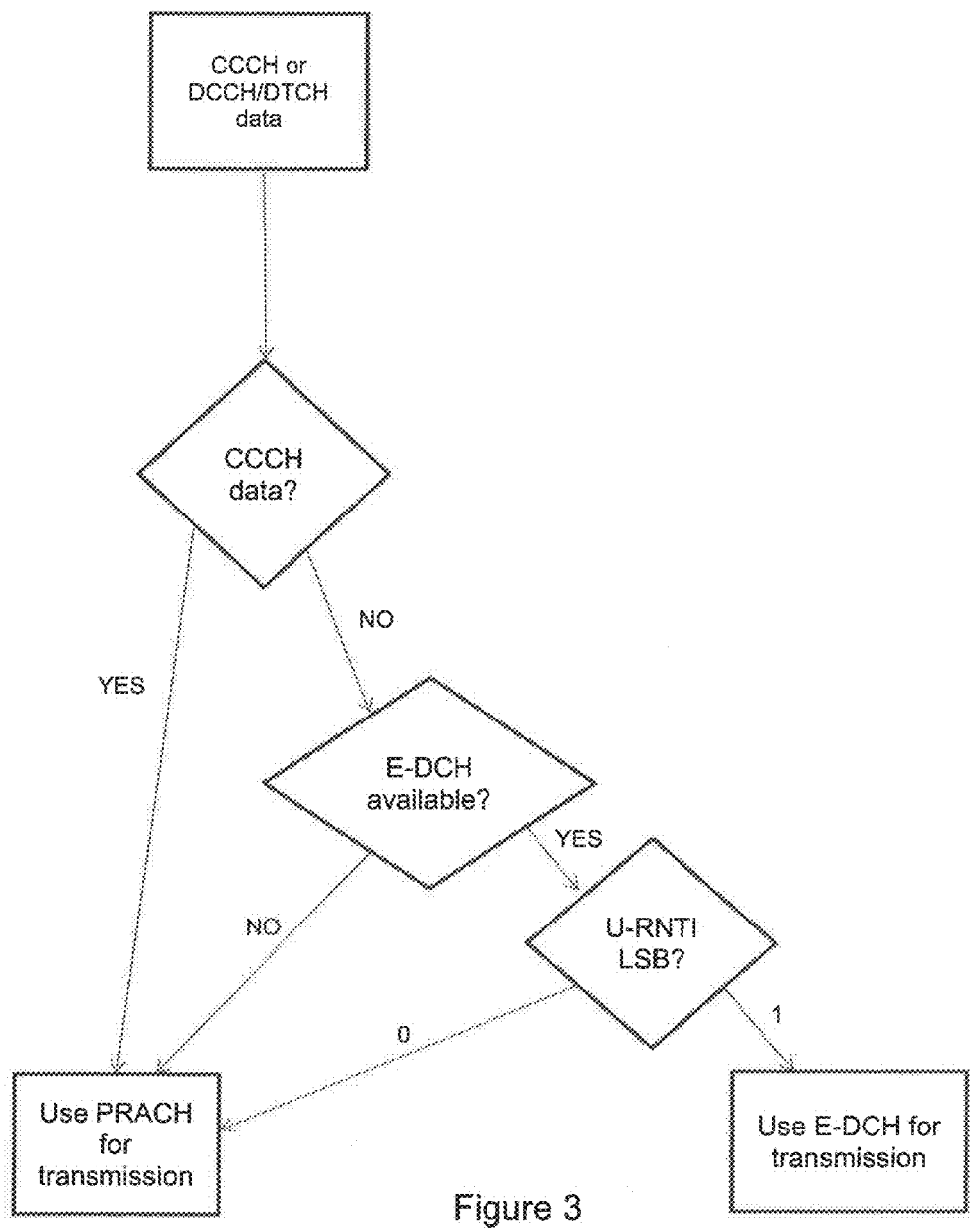
FIG. 3 shows schematically a logic flow diagram of a third example of an embodiment of the present invention.

As one particular example only of this third main example, and referring again to the discussion above in relation particularly to the availability of both PRACH and common E-DCH as uplink channels in the CELL_FACH state, and also to the schematic logic flow diagram of FIG. 3:
1. For UL CCCH data transmission, PRACH is always selected.
2. The UE uses common E-DCH for uplink DCCH and uplink DTCH data transmission if common E-DCH is available and the UE identity's LSB (least significant bit) is 1.
3. Else, the UE uses PRACH for uplink DCCH and uplink DTCH data transmission (i.e. if common E-DCH is not available, and if UE identity's LSB (least significant bit) is 0).

As another particular example of this third main example:
1. For UL CCCH data transmission, PRACH is selected if the UE identity's LSB (least significant bit) is 0, otherwise common E-DCH is selected.
2. The UE uses common E-DCH for uplink DCCH and uplink DTCH data transmission after common E-DCH become available.

Other permutations of these basic criteria may be used, depending on factors such as number of connected wireless devices, data traffic levels, signal conditions, etc.

A detailed discussion will now be given of examples of specific implementations of the examples described above in the context of PRACH and common E-DCH as uplink channels in the CELL_FACH state. In the following, NW is the network control apparatus and UE again the user equipment or wireless device.

As a first example of a specific implementation of uplink resource selection based on logical channel/data type, reference is made to a RRC connection establishment case performed as follows:
1. The NW signals support of the PRACH fallback in downlink RRC signalling (e.g. in system information) provided to the UE.
2. The UE takes a PRACH fallback action upon initiation of a RRC connection establishment procedure if the NW signals support of PRACH fallback.
2a. The UE selects one of the PRACH resources for UL CCCH transmission.
3. if the UE receives RRC CONNECTION SETUP and the RRC state indicator in the message is set to CELL_FACH, the UP configures the common E-DCH and transmits any UL DCCH and UL DTCH data over the common E-DCH.

As a second example of a specific implementation of uplink resource selection based on logical channel/data type, reference is made to a cell update procedure for a cell update case or a URA (user registration area) update case performed as follows:
1. The NW signals support of the PRACH fallback in downlink RRC signalling (e.g. in system information).
2. The UE takes a PRACH fallback action upon initiation of a cell update or URA update procedure if the NW signals support of PRACH fallback.
2a. The UE selects one of the PRACH resources for UL CCCH transmission i.e. CellUpdate/URA update message transmission.
3. if the UE receives CELL UPDATE CONFIRM/URA UPDATE CONFIRM and the RRC state indicator in the message is set to CELL_FACH the UE configures the common E-DCH and transmits any UL DCCH and UL DTCH data over the common E-DCH.

Figure 4:
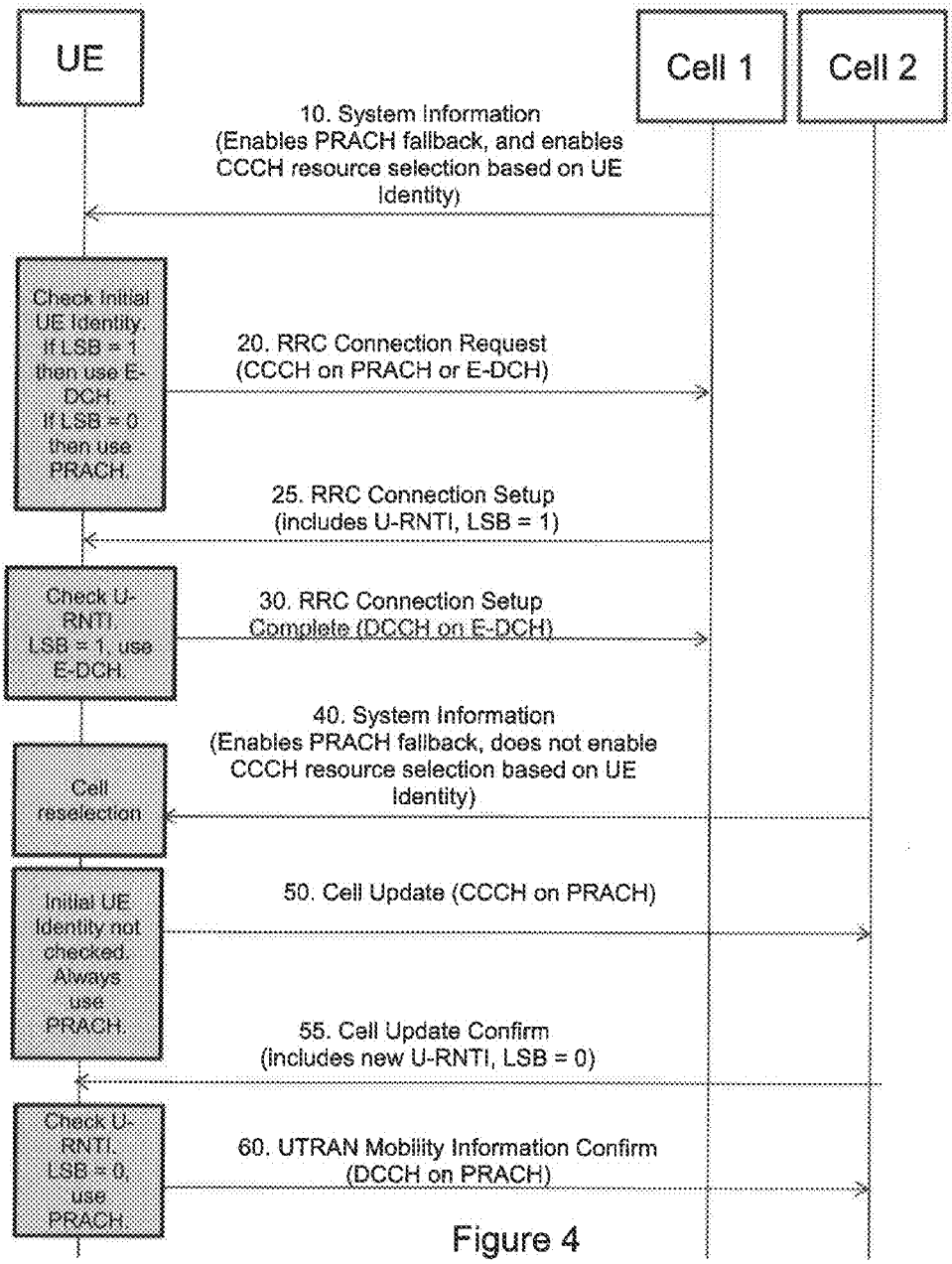
FIG. 4 shows schematically a message sequence chat of a second example of an embodiment of the present invention.

As a first example of a specific implementation of uplink resource selection based on the identity of the wireless device (or UE), reference is made to a RRC connection establishment case shown in part schematically in FIG. 4 and performed by way of example as follows:
1. The NW signals 10 support of the PRACH fallback in downlink RRC signalling (e.g. in system information).
2. The UE takes a PRACH fallback action upon initiation of a RRC connection establishment procedure 20 if the NW signals support of PRACH fallback.
2a. The UE selects one of the PRACH resources if the LSB of the Initial UE Identity signalled in the RRC CONNECTION REQUEST message is 0 or selects one of the common E-DCH resources if the LSB of the UE identity is 1.
3. If the UE receives 25 RRC CONNECTION SETUP and the RRC state indicator in the message is set to CELL_FACH, the UE re-selects the RACH resource based on the LSB of the U-RNTI given by the received RRC message: PRACH is selected if the LSB of the U-RNTI is 0 and the common E-DCH is selected 30 if the LSB of the U-RNTI is 1.

As a second example of a specific implementation of uplink resource selection based on the identity of the wireless device (or UE), reference is made to a cell update procedure for a cell update case or a URA (user registration area) update case again shown in part schematically in FIG. 4 and performed by way of example as follows:
1. The NW signals 40 support of the PRACH fallback in downlink RRC signalling (e.g. in system information).
2. The UE takes a PRACH fallback action upon initiation of a cell update or URA update procedure 50 if the NW signals support of PRACH fallback.
2a. The UE selects one of the PRACH resources if the LSB of the U-RNTI assigned to the UE is 0 and selects one of the common E-DCH resources if the LSB of the U-RNTI is 1.
3. If the UE receives 55 CELL UPDATE CONFIRM/URA UPDATE CONFIRM and the RRC state indicator in the message is set to CELL_FACH, then the UE re-selects the RACH resource based on the LSB of the new U-RNTI given by the received RRC message if it is included in the received RRC message or the U-RNTI stored by the UE (i.e. PRACH is selected 60 if the LSB of the U-RNTI is 0 and the common E-DCH is selected if the LSB of the U-RNTI is 1).

Mention has been made of a "network control apparatus". It will be understood that this is the overall apparatus that provides for general management and control of the network and connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, LTE makes use of a so-called Evolved Node B (eNB) where the RF transceiver and resource management/control functions are combined into a single entity.

Figure 5:
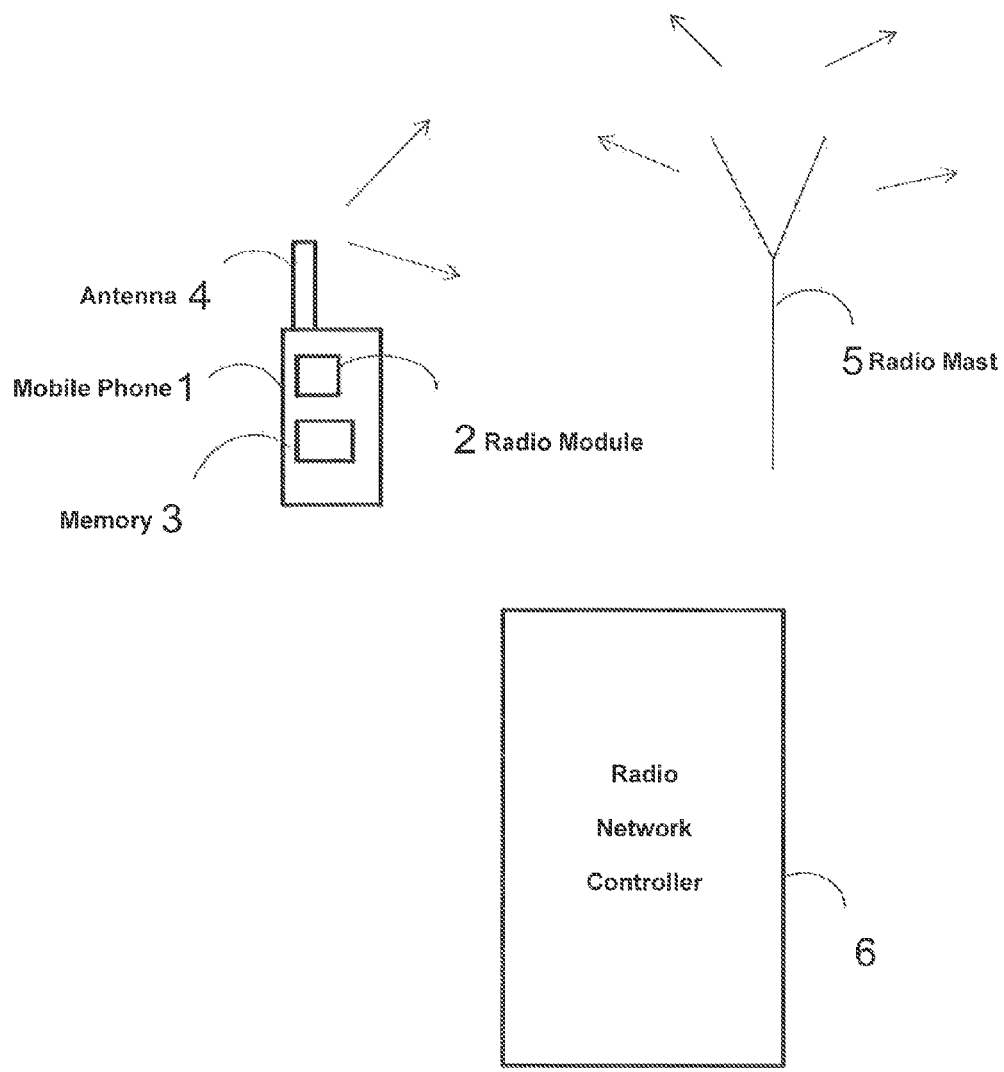
FIG. 5 shows schematically a user equipment or wireless device, in this case in the form of a mobile phone/smartphone in communication with a radio mast.

FIG. 5 shows schematically a user equipment or wireless device, in this case in the form of a mobile phone/smartphone 1. The user equipment 1 contains the necessary radio module 2, processor(s) and memory/memories 3, antenna 4, etc. to enable wireless communication with the network. The user equipment 1 in use is in communication with a radio mast 5. The radio mast 5 in this case is in the form of a Node B which is in communication with a Radio Network Controller 6.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of selecting one of at least a first wireless transmission protocol uplink channel and a second wireless transmission protocol uplink channel for use by a wireless device in transmitting data to a network, the method comprising:
   determining, using a processor in the wireless device, whether the data to be transmitted to the network is to be transmitted as a first type of transmission or as a second type of transmission different than the first type of transmission;
   selecting a first wireless transmission protocol uplink channel for use by the wireless device when performing the first type of transmission; and
   selecting a second wireless uplink transmission protocol channel for use by the wireless device when performing the second type of transmission,
   the first and second wireless transmission protocol uplink channels being different types of physical channels of a single activity state occupied by the wireless device at a particular time.

2. The method according to claim 1, wherein the wireless device selects the second wireless uplink transmission protocol channel for the second type of transmission only when the second wireless uplink transmission protocol channel becomes available but continues to use the first wireless transmission protocol uplink channel for the first type of transmission even if the second wireless uplink transmission protocol channel has become available.

3. The method according to claim 1, wherein the first type of transmission is the transmission of data which is common control channel data.

4. The method according to claim 1, wherein the second type of transmission is the transmission of data which is at least one of dedicated control channel data and dedicated traffic channel data.

5. The method according to claim 1, wherein the first wireless transmission protocol uplink channel uses the Third Generation Partnership Project (3GPP) Physical Random Access Channel and the second wireless transmission protocol uplink channel uses the 3GPP Common Enhanced Dedicated Channel (Enhanced Uplink in CELL_FACH state and idle mode).

6. A method of selecting one of at least a first wireless transmission protocol uplink channel and a second wireless transmission protocol uplink channel for use by a wireless device in transmitting data to a network, the method comprising:
   determining, using a processor in the wireless device, whether the data to be transmitted to the network is to be transmitted as a first type of transmission or as a second type of transmission different than the first type of transmission;
   selecting a first wireless transmission protocol uplink channel for use by the wireless device when performing the first type of transmission and the wireless device has an identity of a first type; and
   selecting a second wireless transmission protocol uplink channel for use by the wireless device:
      when performing the first type of transmission and the wireless device has an identity of a second type different than the identity of the first type; and
      when performing the second type of transmission such that the second wireless transmission protocol uplink channel is used both when the wireless device transmits the first type of transmission while having an identity of the second type and when transmitting the second type of transmission regardless of identity,
   the first and second wireless transmission protocol uplink channels being different types of physical channels of a single activity state occupied by the wireless device at a particular time.

7. The method according to claim 6, wherein at least one of the types of transmission is the transmission of data which is common control channel data.

8. The method according to claim 6, wherein the other type of transmission is the transmission of data which is at least one of dedicated control channel data and dedicated traffic channel data.

9. The method according to claim 6, further comprising determining the identity of the wireless device by analyzing a numerical identifier of the wireless device.

10. The method according to claim 9, wherein the identifier is a string of bits, the wireless device having an identity of the first type if a particular one of the bits is a 0 and having an identity of the second type if said particular one of the hits is a 1.

11. The method according to claim 6, wherein the first wireless transmission protocol uplink channel is the 3GPP Physical Random Access Channel and the second wireless transmission protocol uplink channel is the 3GPP Common Enhanced Dedicated Channel (Enhanced Uplink in CELL_FACH state and idle mode).

12. An apparatus comprising:
   at least one processor; and
   at least one memory including computer program code;
   the at least one memory and the computer program code being configured to, with the at least one processor, cause the apparatus at least to:
   determine whether data to be transmitted from the apparatus is to be transmitted as a first type of transmission or as a second type of transmission different than the first type of transmission;
   select a first wireless transmission protocol uplink channel for use when performing the first type of transmission; and
   select a second wireless uplink transmission protocol channel for use when performing the second type of transmission,
   the first and second wireless transmission protocol uplink channels being different types of physical channels of a single activity state occupied by the wireless device at a particular time.

13. The apparatus according to claim 12, wherein the at least one memory and the computer program code are further configured to, with the at least one processor, cause the apparatus to select the second wireless uplink transmission protocol channel for the second type of transmission only when the second wireless uplink transmission protocol channel becomes available but to continue to use the first wireless transmission protocol uplink channel for the first type of transmission even if the second wireless uplink transmission protocol channel has become available.

14. An apparatus comprising:
at least one processor; and
at least one memory including computer program code;
the at least one memory and the computer program code being configured to, with the at least one processor, cause the apparatus at least to:
determine whether data to be transmitted from the apparatus is to be transmitted as a first type of transmission or as a second type of transmission different than the first type of transmission;
select a first wireless transmission protocol uplink channel for use when performing the first type of transmission and the apparatus has an identity of a first type;
select a second wireless transmission protocol uplink channel for use:
when performing the first type of transmission and the apparatus has an identity of a second type different than the identity of the first type; and
when performing the second type of transmission such that the second wireless transmission protocol uplink channel is used both when the wireless device transmits the first type of transmission while having an identity of the second type and when transmitting the second type of transmission regardless of identity,
the first and second wireless transmission protocol uplink channels being different types of physical channels of a single activity state occupied by the wireless device at a particular time.

15. The apparatus according to claim 14, wherein the first type of transmission is the transmission of data which is common control channel data, the second type of transmission is the transmission of data which is at least one of dedicated control channel data and dedicated traffic channel data, the first wireless transmission protocol uplink channel uses the 3GPP Physical Random Access Channel, the second wireless transmission protocol uplink channel is the 3GPP Common Enhanced Dedicated Channel (Enhanced Uplink in CELL_FACH state and idle mode).

16. The apparatus according to claim 12, wherein the first type of transmission is the transmission of data which is common control channel data, the second type of transmission is the transmission of data which is at least one of dedicated control channel data and dedicated traffic channel data, the first wireless transmission protocol uplink channel uses the 3GPP Physical Random Access Channel and the second wireless transmission protocol uplink channel uses the 3GPP Common Enhanced Dedicated Channel (Enhanced Uplink in CELL_FACH state and idle mode).

17. The apparatus according to claim 14, wherein the identity of the apparatus is determined by a numerical identifier of the apparatus.

18. A wireless device which is wirelessly connectable to a wireless network, the wireless device having a processing system which is wirelessly connectable to a wireless network, the processing system being constructed and arranged to cause the wireless device to:
determine whether data to be transmitted to the network is to be transmitted as a first type of transmission or as a second type of transmission different than the first type of transmission;
select a first wireless transmission protocol uplink channel for use when performing the first type of transmission; and
select a second wireless transmission protocol uplink channel for use when performing the second type of transmission,
the first and second wireless transmission protocol uplink channels being different types of physical channels of a single activity state occupied by the wireless device at a particular time.

19. A non-transitory computer-readable storage medium comprising computer-executable instructions which, when executed on a computing device, cause the computing device to carry out a method of selecting one of at least a first wireless transmission protocol uplink channel and a second wireless transmission protocol uplink channel for use by the wireless device in transmitting data to a network, the method comprising:
determining whether the data to be transmitted to the network is to be transmitted as a first type of transmission or as a second type of transmission different than the first type of transmission;
selecting a first wireless transmission protocol uplink channel for use by the wireless device when performing the first type of transmission; and
selecting a second wireless uplink transmission protocol channel for use by the wireless device when performing the second type of transmission,
the first and second wireless transmission protocol uplink channels being different types of physical channels of a single activity state occupied by the wireless device at a particular time.

* * * * *